United States Patent
Yoshinori et al.

(10) Patent No.: US 9,960,649 B2
(45) Date of Patent: May 1, 2018

(54) ROTATING ELECTRIC MACHINE

(71) Applicant: Mitsubishi Electric Corporation, Tokyo (JP)

(72) Inventors: Manabu Yoshinori, Tokyo (JP); Yoshiaki Kitta, Tokyo (JP); Koichi Ojima, Tokyo (JP); Hiroyuki Higashino, Tokyo (JP); Toshiya Chazono, Tokyo (JP); Masaki Horii, Tokyo (JP)

(73) Assignee: Mitsubishi Electric Corporation, Tokyo (JP)

(\*) Notice: Subject to any disclaimer, the term of this patent is extended or adjusted under 35 U.S.C. 154(b) by 294 days.

(21) Appl. No.: 14/840,285

(22) Filed: Aug. 31, 2015

(65) Prior Publication Data

US 2016/0322874 A1 Nov. 3, 2016

(30) Foreign Application Priority Data

Apr. 28, 2015 (JP) .................................. 2015-091038

(51) Int. Cl.
| | |
|---|---|
| *H02K 9/00* | (2006.01) |
| *H02K 1/32* | (2006.01) |
| *H02K 9/19* | (2006.01) |
| *H02K 5/20* | (2006.01) |

(52) U.S. Cl.
CPC .................. *H02K 1/32* (2013.01); *H02K 5/20* (2013.01); *H02K 9/19* (2013.01)

(58) Field of Classification Search
CPC ............... H02K 1/32; H02K 9/19; H02K 9/06
USPC .............................. 310/52, 54, 58, 64, 59, 61
See application file for complete search history.

(56) References Cited

U.S. PATENT DOCUMENTS

| | | | | |
|---|---|---|---|---|
| 6,114,784 A | * | 9/2000 | Nakano | B60K 6/26 |
| | | | | 310/113 |
| 2006/0226717 A1 | * | 10/2006 | Nagayama | H02K 9/14 |
| | | | | 310/58 |
| 2013/0038151 A1 | * | 2/2013 | Ohashi | H02K 1/32 |
| | | | | 310/59 |

(Continued)

FOREIGN PATENT DOCUMENTS

| | | |
|---|---|---|
| CN | 103843232 A | 6/2014 |
| JP | 56-117548 A | 9/1981 |
| JP | 2010-239799 A | 10/2010 |

(Continued)

OTHER PUBLICATIONS

Communication dated Nov. 17, 2015 from the Japanese Patent Office issued in corresponding Japanese application No. 2015-091038.

(Continued)

*Primary Examiner* — Hanh Nguyen
(74) *Attorney, Agent, or Firm* — Sughrue Mion, PLLC; Richard C. Turner

(57) ABSTRACT

A coolant flow path structure which cools a rotor is configured of a first coolant flow path forming a radial coolant flow path of the rotor and a second coolant flow path communicating with the first coolant flow path and forming an axial coolant flow path of the rotor, and a negative pressure structure, which brings an exist of the coolant flow path structure into a negative pressure as a result of a rotation of the rotor, is provided at the exit of the second coolant flow path.

6 Claims, 4 Drawing Sheets

(56) References Cited

U.S. PATENT DOCUMENTS

2014/0042841 A1* 2/2014 Rippel ................... H02K 1/20
                                                      310/54
2015/0015099 A1    1/2015 Matsuki et al.

FOREIGN PATENT DOCUMENTS

| JP | 2011-211862 A | 10/2011 |
| JP | 2011-254574 A | 12/2011 |
| JP | 2012-105487 A | 5/2012  |
| JP | 2013-21811 A  | 1/2013  |

OTHER PUBLICATIONS

Communication dated Jan. 2, 2018, from State Intellectual Property Office of the P.R.C in counterpart application No. 201510964874.3.

* cited by examiner

ROTATING ELECTRIC MACHINE

BACKGROUND OF THE INVENTION

Field of the Invention

The present invention relates to a rotating electric machine, and in particular to a cooling structure of a rotor of a rotating electric machine.

Description of the Related Art

A rotating electric machine is used as a generator and a motor, but in any case, heat is generated by current flowing through the coils of a rotor and stator, and operational efficiency decreases due to the generated heat. Because of this, the operational efficiency is maintained by cooling, the rotor and stator.

When current is caused to flow through the coil of the stator of the rotating electric machine, heat is generated in the coil by generation of Joule heat. Also, permanent magnets being buried in a circumferential direction of the rotor, eddy current is generated in the permanent magnets as a result of a rotation of the rotor, and the permanent magnets generate heat due to the eddy current.

In order to cool the coil of the stator and the permanent magnets, it is proposed that an intra-axial coolant flow path, formed by hollowing out the shaft of the rotor, through which a coolant flows in an axial direction, and a radial coolant flow path, formed by an end plate of the rotor, through which a coolant flows in a radial direction, are provided, and that the rotor is cooled by causing a coolant to flow with a pump.

As for cooling of the rotating electric machine, for example, in JP-A-2010-239799 (Patent Document 1), a structure wherein the rotor is cooled by causing a coolant to circulate through the radial coolant flow path of the end plate from the intra-shaft coolant flow path of the rotation shaft of the rotor, and after the rotor has been cooled, the coolant spouts toward the stator, thus cooling the stator, is proposed as a cooling structure.

When the coolant flow path is configured by a plurality of members, such as the rotor and the end plate, in this way, a centrifugal force acting on the coolant becomes stronger when the rotor rotates at high speed, and the coolant leaking out from the gap between the rotor and the end plate becomes a problem. As a solution to the problem, for example, in JP-A-2011-254574 (Patent Document 2), a configuration is adopted such that a coolant leakage decreases by providing a mechanism which, by utilizing the centrifugal force generated by a rotation of the rotor, increases the adhesion of the rotor to the end plate in response to the centrifugal force.

[Patent Document 1] JP-A-2010-239799
[Patent Document 2] JP-A-2011-254574

When the coolant flow path is configured by a plurality of members in this way, there is the problem that cooling efficiency decreases due to a coolant leakage unless the airtightness between the members is enhanced, and with a structure utilizing the centrifugal force for enhancing the adhesion, as in (Patent Document 2), as a solution to the problem, a new problem of an increase in the size of the whole device arises.

SUMMARY OF THE INVENTION

The invention, having been contrived in order to solve the previously described kinds of problems, has for its object to provide a rotating electric machine which has a cooling structure in which a coolant flow path which cools a rotor is configured by a plurality of members, which prevents a coolant from leaking even when the rotor is rotated at high speed and which keeps the whole device from being particularly large-scaled.

A rotating electric machine according to the invention includes a coolant flow path structure which cools a rotor; and a negative pressure structure. The rotor is configured of a rotor core and end plates provided one at either axial end of the rotor core. The coolant flow path structure is configured of a first coolant flow path forming a radial coolant flow path of the rotor and a second coolant flow path communicating with the first coolant flow path and forming an axial coolant flow path of the rotor. The negative pressure structure, which brings an exit of the coolant flow path structure into a negative pressure as a result of a rotation of the rotor, is provided at the exit of the second coolant flow path.

As the negative pressure structure which brings the exit into a negative pressure, the exit of the coolant flow path structure protrudes from the wall surface of the end plate.

In order to efficiently generate a negative pressure, the rotating electric machine further includes a fan which rotates integrally with the rotor and generates a radial air flow around the axial exit.

Also, when magnets are buried in the inside of the rotor, a configuration is adopted such that the second coolant flow path of the coolant flow path structure is in contact with each magnet in order to cool the magnet.

According to the invention, as the coolant is caused to flow by bringing the exit of the coolant flow path structure into a negative pressure with the negative pressure structure, it is possible to reduce the leakage quantity of coolant leaking from the gap between the rotor core of the rotor and the end plate, and thus possible to efficiently cool the rotor.

Also, as the exit of the coolant flow path structure is protruded from the wall surface of the end plate, a negative pressure is appropriately generated.

Furthermore, by providing the fan, a radial air flow is generated around the exit of the coolant flow path structure, thus bringing the exit of the coolant flow path structure into a negative pressure, leading to a decrease in the pressure of the whole of the coolant, and it is thereby possible to reduce a coolant leakage from the gap between the rotor and the end plate.

The foregoing and other objects, features, aspects, and advantages of the present invention will become more apparent from the following detailed description of the present invention when taken in conjunction with the accompanying drawings.

DETAILED DESCRIPTION OF THE PREFERRED EMBODIMENTS

First Embodiment

Hereafter, a description will be given of a first embodiment of the invention.

Figure 1:
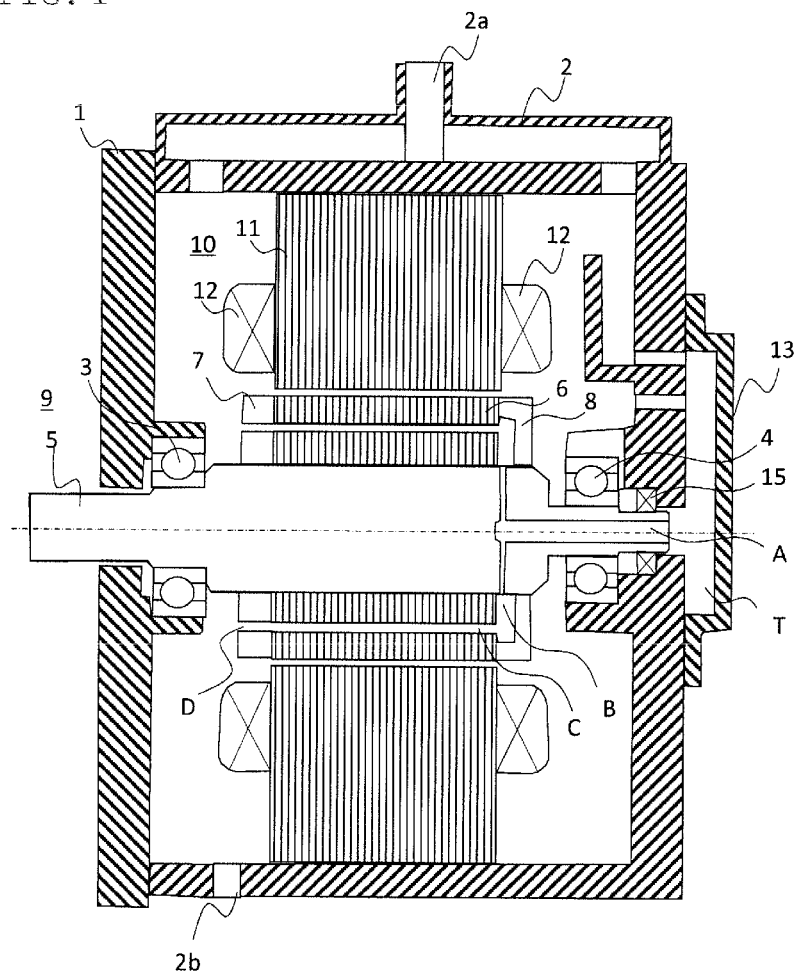
FIG. 1 is a schematic axial sectional view of a rotating electric machine of a first embodiment of the invention.

FIG. 1 shows a schematic structure of a rotating electric machine in the first embodiment of the invention.

As shown in FIG. 1, the rotating electric machine is configured in a housing configured of a front side housing 1 and a rear side housing 2, wherein front side bearings 3 are provided in the front side housing 1, while rear side bearings 4 are provided in the rear side housing 2, and a shaft 5 is mounted so as to be rotatable by the front side bearings 3 and the rear side bearings 4. A rotor core 6 is mounted on the shaft 5, and a stator core 11 is disposed on the outer periphery of the rotor core 6 with a gap in between. A front side end plate 7 and a rear side end plate 8 are fixed one on either axial side of the rotor core 6. That is, a rotor 9 is configured of the shaft 5, the front side end plate 7, the rotor core 6, and the rear side end plate 8. A stator 10 is configured of the stator core 11 and a coil 12 wound on the stator core 11.

Figure 2:
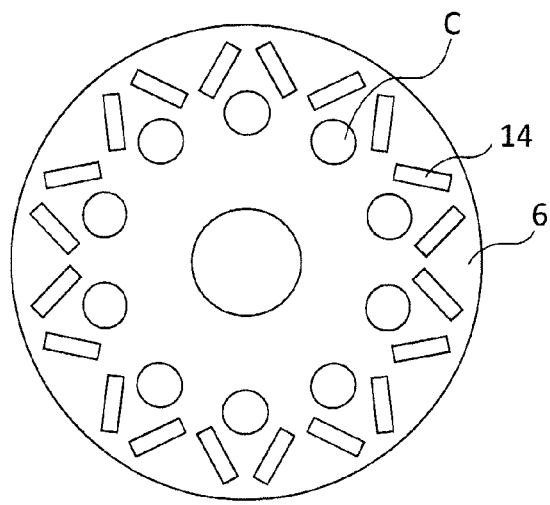
FIG. 2 is a schematic radial sectional view of a rotor of the rotating electric machine of the first embodiment of the invention.

A plurality of magnets 14 are buried in the rotor core 6, as shown in FIG. 2.

In the rotating electric machine of this structure, coolant flow paths are configured in the following way in order to cool the rotor core 6.

Firstly, a coolant pumped from a pump (not shown) is received at a coolant inflow portion 2a provided in an upper portion of the rear side housing 2, and is spouted into the housing from the upper portion of the rear side housing 2, and one portion of the coolant is used no cool the stator core 11 and the coil 12 of the stator 10, while another portion flows down the inner wall surface of the housing and is stored in a coolant reservoir T configured by the rear side housing 2 and a cover 13, and the remaining coolant flows down the inner wall surface of the housing toward a coolant outflow portion 2b provided in an lower portion of the rear side housing 2 while cooling the whole.

The coolant in the coolant reservoir T is used to cool the rotor core 6. The space between the rear side housing 2 and the shaft 5 is sealed by a seal member 15, and the coolant in the coolant reservoir T leads into a coolant lead-in hole A, provided in an end face of the shaft 5, which is the only opening. The coolant lead-in hole A is a communication hole provided in an axial direction of the shaft 5, and the leading end of the coolant lead-in hole A communicates with a coolant flow path B configured by the shaft 5, the rotor core 6, and the rear side end plate 8. The coolant flow path B is a flow path which is provided, in a radial pattern in a radial direction of the shaft 5, between a wall surface of the rotor core 6 and the rear side end plate 8. The leading end of the coolant flow path B communicates with a coolant flow path C passing axially through the inside of the rotor core 6. The coolant flow path C is provided with a plurality of through holes disposed uniformly in a circumferential direction, as shown in the sectional view of FIG. 2.

The leading end of the coolant flow path C communicates with a coolant flow path exit D of the front side end plate 7. As the coolant flow path exit D opens substantially perpendicular to the surface of the front side end plate 7, a high speed rotation of the rotor 9 speeds up the flow of a gas around the rotor 9, because of which a negative pressure is generated at the coolant flow path exit D. In particular, by the rotor 9 rotating, that is, by the front side end plate 7 itself rotating, a coolant in the vicinity of the coolant flow path D is subjected to the action of the synergistic effect of the negative pressure with a centrifugal force, meaning that the coolant in the coolant flow path C is sucked out from the coolant flow path exit D of the front side end plate 7, thus creating a coolant flow smoothly.

By the coolant being brought into a negative pressure, it is possible to reduce the leakage quantity of coolant even though there is a gap between the rotor core 6 and the front side end plate 7, or even though there is a gap between the rotor core 6 and the rear side end plate 8.

Second Embodiment

Figure 3:
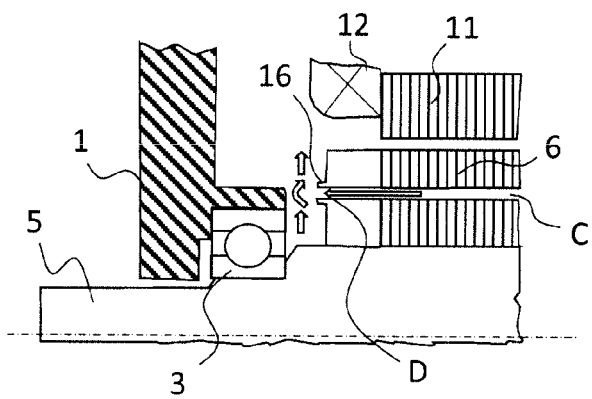
FIG. 3 is a schematic diagram showing one portion of a section of a rotating electric machine of a second embodiment of the invention.

FIG. 3 shows a structure of a rotating electric machine in a second embodiment of the invention. In FIG. 3, a protruding exit 16 is provided on the coolant flow path exit D side of the front side end plate 7. As the exit 16, by protruding, is strongly affected by a radially outward air flow formed by a rotation of the shaft 5, it is possible to increase a negative pressure generated at the coolant flow path exit D. Because of this, it is possible to reduce the leakage quantity of liquid refrigerant from the axial gap between the rotor core 6 and the rear side end plate 8.

When a coolant flow path through which a coolant flows causes the coolant to flow with a pressure from, for example, a pump Z (not shown), the pumping effect of the coolant flow path exist D>that of the pump Z when the capacity of the pump Z is small, and a pressure loss occurs in the pump Z, thus preventing a large flow of coolant from flowing. However, by providing the coolant reservoir T to open the coolant to the atmosphere, as shown in FIG. 1, it is possible to optimize the pumping effect depending on the number of revolutions. Alternatively, it is possible to adopt a configuration such that when a plurality of rotating electric machines or generators share a cooling flow path entrance pipe, there is no change in the pumping effect resulting from a difference in the number of revolutions from one another, causing no mutual interference. Also, as it is no more necessary to cause an oil pump to pump the coolant into the coolant lead-in hole A, it is possible to reduce the flow path length required to be kept high in airtightness.

Third Embodiment

Figure 4:
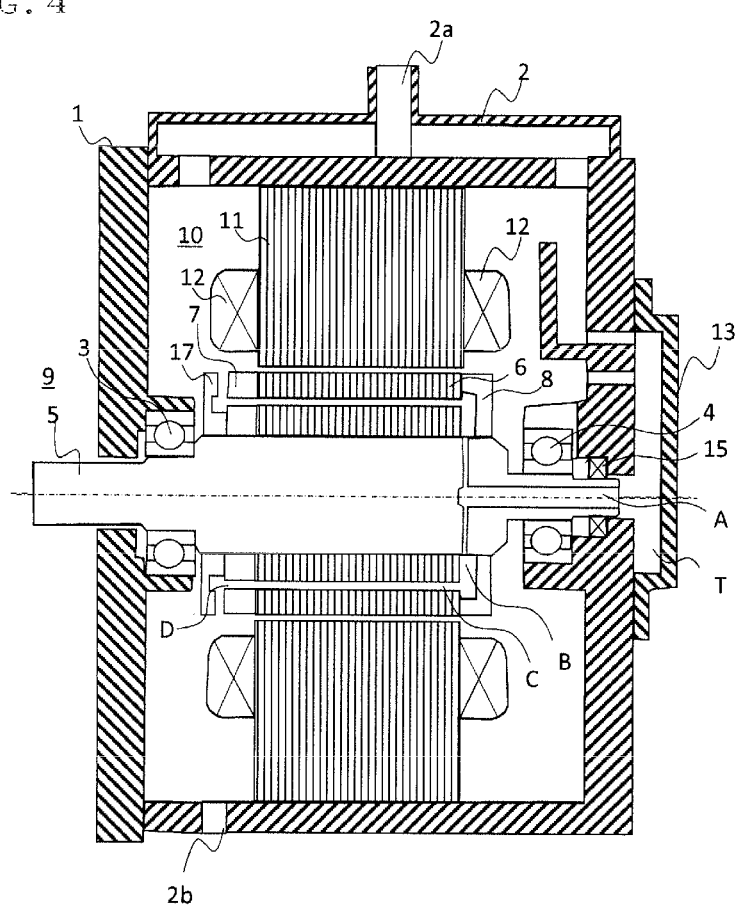
FIG. 4 is a schematic axial sectional view of a rotating electric machine of a third embodiment of the invention.

FIG. 4 shows a structure of a rotating electric machine in a third embodiment of the invention. As shown in FIG. 4, a rotor fan 17 is fixed to the shaft 5 between the bearings 3 and the front side end plate 7. A rotation of the rotor fan 17 generates the air flowing radially outward, thus enabling an increase in the negative pressure generated at the coolant flow path exit D. Because of this, it is possible so reduce the leakage quantity of liquid refrigerant from the axial gap between the rotor core 6 and the rear side end plate 8.

Fourth Embodiment

Figure 5:
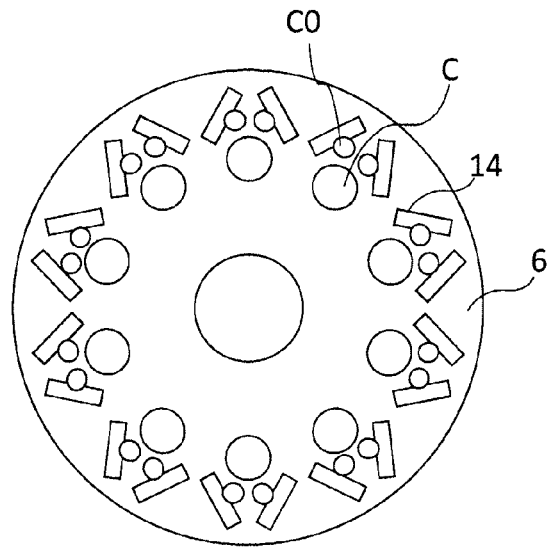
FIG. 5 is a schematic radial sectional view of a rotor of a rotating electric machine of a fourth embodiment of the invention.

FIG. 5 shows a structure of a rotating electric machine in a fourth embodiment of the invention. As shown in FIG. 5 apart from the axial coolant flow paths C, axial branch coolant flow paths C0 are provided branched so as to pass the respective surfaces of the magnets 14 buried in the rotor core 6. As the liquid refrigerant flowing through the branch coolant flow paths C0 makes direct contact with the magnets 14, it is possible to efficiently cool the magnets 14. Also as it is possible to use inexpensive magnets with a low heat-resistant grade, it is possible so reduce the cost of the rotating electric machine.

Fifth Embodiment

Figure 6:
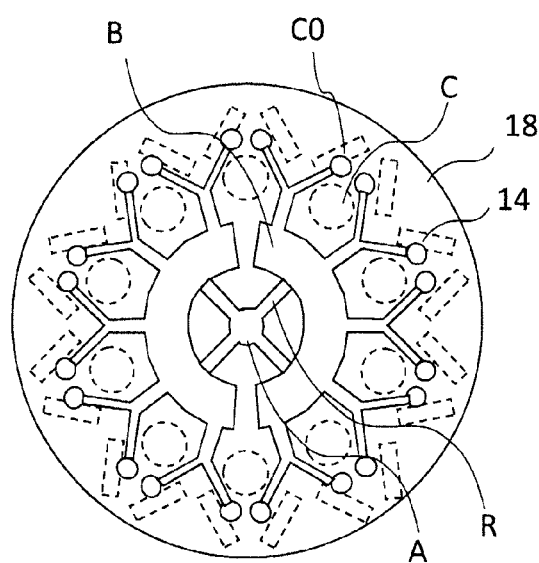
FIG. 6 is a sectional view showing a schematic configuration of a flat plate which guides a coolant to branch coolant flow paths of a rotor of a rotating electric machine of a fifth embodiment of the invention.

FIG. 6, showing a fifth embodiment of the invention, shows a configuration for guiding a coolant to the branch coolant flow paths C0, as shown in the fourth embodiment, and although not particularly shown in the drawing, represents a shape of a coolant flow path structure configured by the rear side end plate 8 and a plate 18. The coolant lead-in hole A provided in the shaft 5 is in the central position in FIG. 6, and in order to guide the coolant, which is led into the coolant lead-in hole A in the central position, to the terminal branch coolant flow paths C0, the coolant is guided to radial coolant flow paths R communicating with the coolant lead-in hole A, and after having been guided in the radial direction, guided to the branch coolant flow paths C0 through further branched radial flow paths. That is, the plate 18, in portions of which corresponding to the terminal portions of the flow paths through holes are selectively provided, is superimposed on the rear side end plate 8 in which grooves patterned with coolant flow paths and flow path branches are formed, thereby forming the flow paths from the central portion of the shaft 5 to the radial terminals. Even though coolant flow paths are formed by superimposing the rear side end plate 8 and flat plate in this way, a coolant flowing through the flow paths is at a negative pressure, meaning that it is possible to cause the coolant to flow with there being less coolant leakage from the gap between the superimposed plates.

In the previously described embodiments, as a negative pressure structure which brings the coolant flow path exit D into a negative pressure, the one wherein a flow path portion is formed in the front side end plate 7 so as to open substantially perpendicular to the surface of the front side endplate 7 is shown, but it is also possible to slant the flow path portion outward from the center. That is, when the flow path portion is slanted toward the coolant flow path exit D from where the front side end plate 7 is in contact with the rotor core 6, the coolant is sucked out so as to follow an air flow generated on the surface of the front side end plate 7 when the rotor 9 rotates, resulting in a more increase in effectiveness. This slanting structure is such that by slanting the flow path portions of the front side end plate 7, it is not necessary to cost trouble in processing the rotor core 6, thus enabling an inexpensive work.

In the embodiments, the coolant has been described as a common coolant, but the invention not being limited to this, an automatic transmission fluid. (ATF), a cooling oil, or the like, may be used as a cooling medium.

Also, in the previously described embodiments, a description has been given using front and rear for simplicity of description, but whether which is front or rear, there is no limitation on appellation by replacing front and rear.

In the invention, it is possible to freely combine the embodiments and appropriately modify or omit any of the embodiments without departing from the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. A rotating electric machine comprising:
a coolant flow path structure and a negative pressure structure, wherein
the coolant flow path structure, which cools a rotor configured of a rotor core and end plates provided at both axial ends of the rotor core, is configured of a first coolant flow path forming a radial coolant flow path of the rotor and a second coolant flow path communicating with the first coolant flow path and forming an axial coolant flow path of the rotor, and wherein
the negative pressure structure, which brings an exit of the coolant flow path structure into a negative pressure as a result of a rotation of the rotor, is provided at the exit of the second coolant flow path, and
wherein a coolant reservoir opening to the air is provided at the entrance of the first coolant flow path, and a coolant flows from the coolant reservoir to the first coolant flow path.

2. The rotating electric machine according to claim 1, wherein
as the negative pressure structure which brings the exit into a negative pressure, the exit of the coolant flow path structure protrudes from the wall surface of the end plate.

3. The rotating electric machine according to claim 1, further comprising:
a fan which rotates integrally with the rotor and generates a radial air flow around the axial exit.

4. The rotating electric machine according to claim 1, wherein
the second coolant flow path axially passes the surface of each magnet buried in the rotor core.

5. The rotating electric machine according to claim 1, wherein
a coolant reservoir opening to the air is provided at the entrance of the first coolant flow path, and a coolant flows from the coolant reservoir to the first coolant flow path.

6. A rotating electric machine comprising:
a coolant flow path structure and a negative pressure structure, wherein
the coolant flow path structure, which cools a rotor configured of a rotor core and end plates provided at both axial ends of the rotor core, is configured of a first coolant flow path forming a radial coolant flow path of the rotor and a plurality of second coolant flow paths communicating with the first coolant flow path and forming axial coolant flow paths of the rotor,
wherein branches to the plurality of second coolant flow paths are configured by superimposing an end plate, by which an axial flow path and radial flow path are formed, and a flat plate in which through holes are selectively provided, and wherein
the negative pressure structure, which brings an exist of the coolant flow path structure into a negative pressure as a result of a rotation of the rotor, is provided at the exit of the second coolant flow path.

* * * * *